United States Patent [19]

Svenning et al.

[11] Patent Number: 5,253,223
[45] Date of Patent: Oct. 12, 1993

[54] SEISMIC DEVICE

[75] Inventors: Bjornar Svenning, Trondheim; Eivind Berg, Ranheim, both of Norway

[73] Assignee: Den Norske Stats Oljeselskap A.S., Stavanger, Norway

[21] Appl. No.: 848,010
[22] PCT Filed: Oct. 22, 1990
[86] PCT No.: PCT/NO90/00158
 § 371 Date: Apr. 27, 1992
 § 102(e) Date: Apr. 27, 1992
[87] PCT Pub. No.: WO91/06878
 PCT Pub. Date: May 16, 1991

[30] Foreign Application Priority Data

Oct. 26, 1989 [NO] Norway .................. 894262

[51] Int. Cl.$^5$ .......................... G01V 1/16; G01V 1/38
[52] U.S. Cl. .................... 367/178; 367/188; 367/15; 181/122; 181/401
[58] Field of Search .................. 367/178, 188, 15, 75; 181/122, 401, 402; 346/33 C

[56] References Cited

U.S. PATENT DOCUMENTS

| | | | |
|---|---|---|---|
| 3,987,404 | 10/1976 | Woodruff | 367/3 |
| 4,134,097 | 1/1979 | Cowles | 367/13 |
| 4,163,206 | 7/1979 | Hall, Jr. | 367/160 |
| 4,323,988 | 4/1982 | Will et al. | 367/4 |
| 4,405,036 | 9/1983 | Wener et al. | 181/110 |
| 4,516,227 | 5/1985 | Wener et al. | 367/15 |
| 4,870,625 | 9/1989 | Young et al. | 367/16 |
| 5,007,031 | 4/1991 | Erich, Jr. | 367/178 |

Primary Examiner—Ian J. Lobo
Attorney, Agent, or Firm—Foley & Lardner

[57] ABSTRACT

A device including instruments for use on the seabed for the collection and recording of first signals during offshore seismic exploration. The device includes first, second and third geophones arranged in x, y and z directions, respectively, which produce geophone signals: an electronic angle gauge; a compass; a top portion having means for allowing said device to be handled; an intermediate portion being substantially cylindrical in shape and having a first end being connected to the top portion; a pointed end, connected to a second end of the intermediate portion, which houses geophones, the electronic angle gauge and the compass; a hydrophone for recording pressure waves which is disposed proximate to the top portion; a battery; a processor which processes the geophone signal; a memory unit which stores information; an acoustic communications system for receiving and transmitting second and third signals; an optical reader which reads collected measurements; and a power supply which supplies power to the processor and the memory unit. In addition, the battery, the processor, the memory unit, the communications system, the optical reader, the power supply, and the hydrophone are disposed in the intermediate portion.

4 Claims, 4 Drawing Sheets

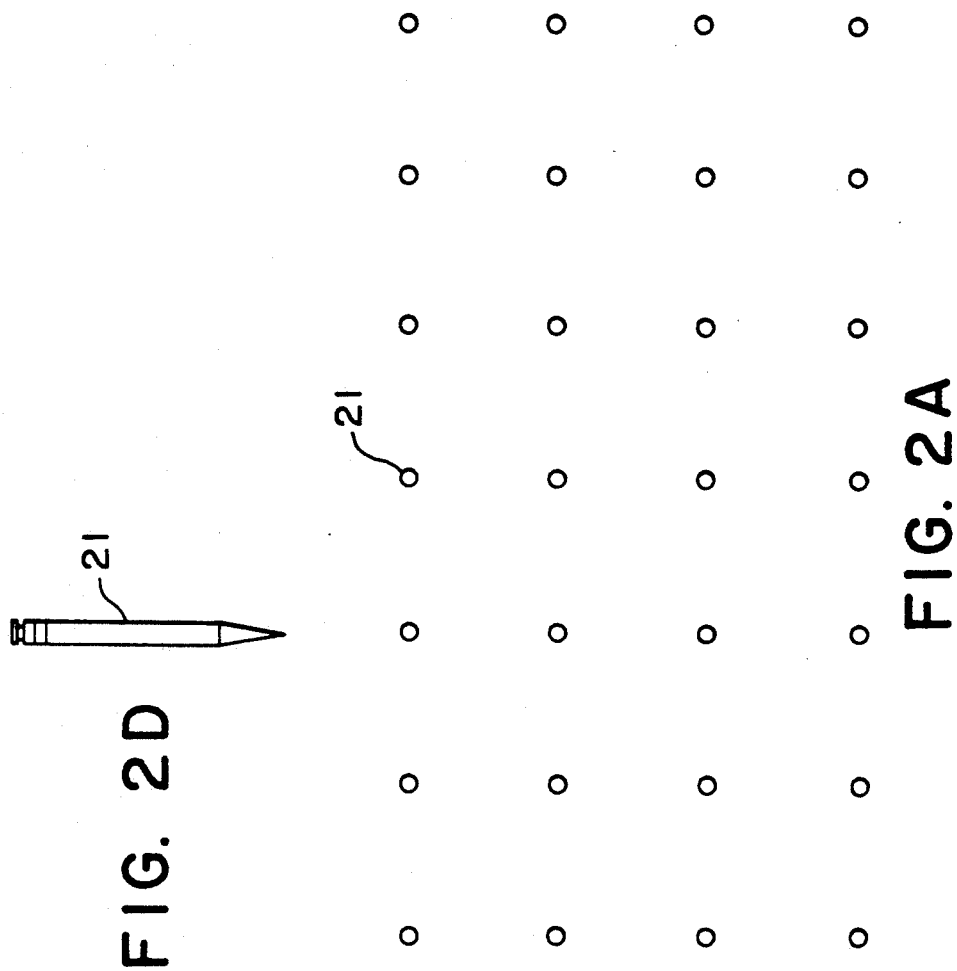
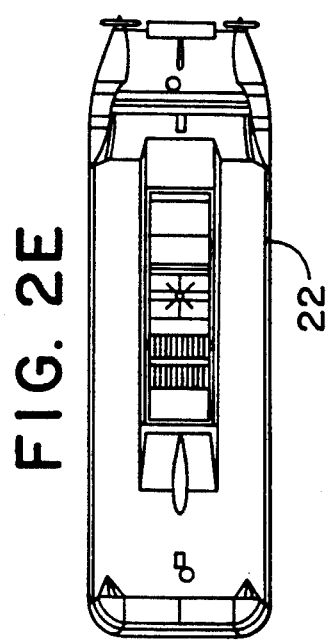

SEISMIC DEVICE

BACKGROUND OF THE INVENTION

1. Field of the Invention

The present invention relates to a device and a method for use on a seabed to collect and record signals during the execution of marine seismic off-shore explorations. Basically, the invention concerns seismic exploration of the substratum offshore, where pressure and shear waves from the substratum are measured in response to the releasing of pressure and/or shear wave energy.

2. Description of the Related Art

Marine seismic exploration is usually carried out by a seismic cable provided with several hydrophones being towed at a certain depth. Pressure waves are released in the vicinity of the cable in several ways. This usually takes place by means of air guns. The pressure wave energy travels downwards through the substratum, but parts of the pressure waves are reflected from areas where there are acoustic impedance features in the substratum. The hydrophones record the reflected pressure waves in the water and transform this information into electric signals which are received and processed on the seismic ship which tows the cable. Using this method, only reflected and/or converted shear to pressure wave energy is recorded. However, it is known that down in the formation both pressure waves and shear waves will be reflected. The shear waves do not travel in water and cannot therefore be detected by a hydrophone cable. Moreover, with today's conventional hydrophone technology, it is not possible to detect the directions of the measured signals, and this severely complicates the possibilities of three-dimensional data collection.

SUMMARY OF THE INVENTION

The objective of the invention is to provide a new and improved device and method for the recording of three-dimensional pressure and shear waves which travel in the substratum.

The above objective is met by providing a device including instruments for use on seabed for the collection and recording of first signals during off-shore seismic exploration. The device includes first, second and third geophones arranged in x, y and z directions, respectively, which produce geophone signals; an electronic angle gauge; a compass; a top portion having means for allowing said device to be handled; an intermediate portion being substantially cylindrical in shape and having a first end being connected to the top portion; a pointed end, connected to a second end of the intermediate portion, which houses the geophones, the electronic angle gauge and the compass; a hydrophone for recording pressure waves which is disposed proximate to the top portion; a battery; a processor which processes the geophone signal; a memory unit which stores information; an acoustic communications system for receiving and transmitting second and third signals; an optical reader which reads collected measurements; and a power supply which supplied power to the processor and the memory unit. In addition, the battery, the processor, the memory unit, the communication system, the optical reader, the power supply, and the hydrophone are disposed in the intermediate portion.

BRIEF DESCRIPTION OF DRAWINGS

The invention will be more closely described in the following, with reference to the accompanying drawings where:

FIG. 2A illustrates a sub sea vessel after the laying out of poles on the sea-bed, seen from above.

FIG. 2D shows a geopole.

FIG. 2E shows a submarine vessel.

DETAILED DESCRIPTION OF THE PREFERRED EMBODIMENT

Figure 1:
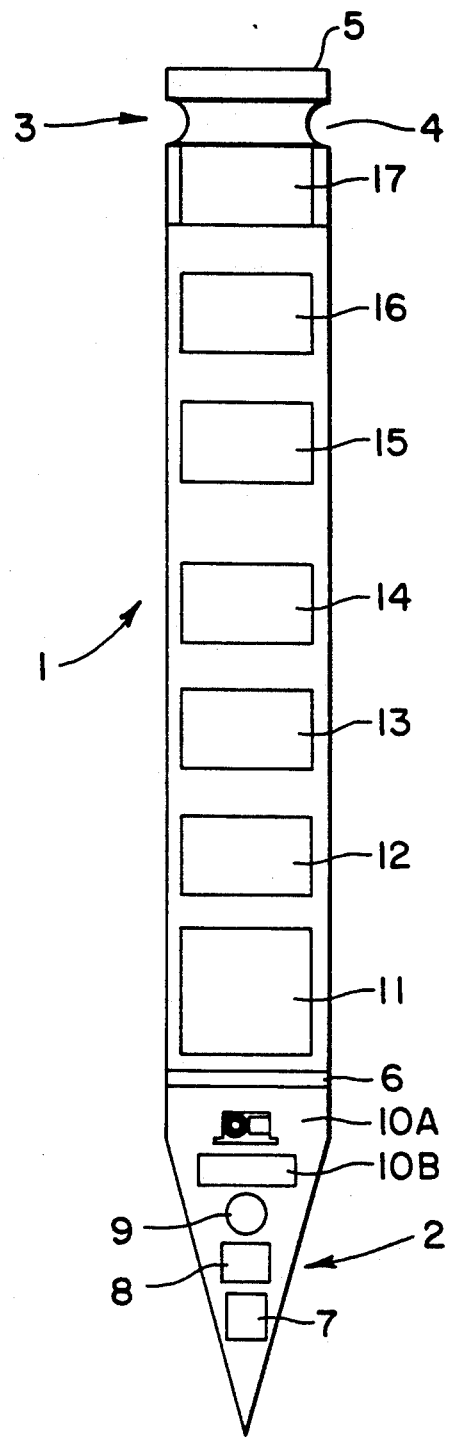
FIG. 1 shows a schematical drawing of a geopole according to the invention.

The device shown in FIG. 1 has a pole-like shape and comprises a cylindrical portion 1, a lower conically shaped or pointed end 2 and an upper portion 3. The upper portion 3 is compatible to equipment for inserting the pole down into, or pulling it out of the sea bed. In the shown embodiment, the upper portion is designed with a narrowing part 4 and an upper flange 5. This design is advantageous in that the flange 5 can be utilized as a striking organ for forcing the pole down into the sea bed. The narrow part 4 is useful, for instance, when an engaging organ on a submarine is used to pull up pole from the sea bed, by making contact with the underside of the flange.

The pointed end 2 of the pole is insulated from the rest of the pole by a vibration insulating spacer 6. In a preferred embodiment the spacer 6 is made of an elastomer.

The actual point is shown in FIG. 1 with a substantially conical shape which makes it easier for the pole to penetrate down into the sea bed. Other forms of embodiment are also applicable, for example a point divided into two with a lower cone shape ending in a shoulder and thereafter progressing into a new cone portion. Within the scope of the invention, other embodiments of the point can also be conceived.

The cylindrical part 1 of the pole constitutes the main volume of the pole and comprises a substantial part of all the equipment. The actual pole should be made of a metal, suitable an aluminium alloy.

The pointed end 2 of the pole comprises, in a preferred embodiment, three geophones 7-9 arranged three-dimensionally in an x, y and z direction. The geophones 7-9 which as such are of a known type per se being commercially available, and will therefore not be more closely described. It is important that the geophones 7-9 are given good contact with the pointed end 2 of the geopole, and this can be achieved by the geophones being moulded into the pointed end by means of a polymer material.

In the pointed end 2 an electronic angle gauge 10a is also placed, which, based on the force of gravity forms the angle of the pole with the vertical axis. The end comprises further a compass 10b by which the rotation of the pole in the plane can be read. By means of these instruments, the exact position of the pole can be decided, which is necessary in order to decide the direction of the measured signals.

The cylindrical portion 1 of the pole contains the other equipment components. The location of the various components is decided by several factors. An important factor is that the pole's centre of gravity shall be as close as possible to the pointed end 2. It is also desirable that components which are in direct contact with each other are also localized next to each other.

In the shown embodiment, a battery 11 which can provide power to the other systems is placed at the lowermost part of the cylindrical portion. Rechargeable lithium batteries are the preferable choice. Suitably the batteries will be recharged above the sea. If recharging should take place under the water, dependence on conductive couplings should be avoided, instead, recharging should take place by induction in a coil which is placed in the cylinder wall or is fitted into the engagement flange 5.

Above the battery, in the next unit, a processor 12 is placed, which at least processes signals from the geophones 7-9, from the electronic angle gauge 10a/the compass 10b and from a hydrophone which will be more closely described later.

In a next unit placed above the processor 12 a memory unit 13 is placed. Seismic data, as well as background information about angle and direction is stored partly in the processor 12 and partly in the memory part 13.

The pole comprises further a power supply unit 14 for supply of power to the various units.

The pole comprises further an acoustic communications system 15 which can fulfill several functions. When several poles stand together in a pattern on the sea bed, it is necessary that it is possible to start/stop the collection of data of all of the poles at the same time. This can be done via acoustic signals which are detected by the geopole's receiver. Moreover it will be desirable that the poles are able to transmit acoustic signals when the poles are gathered in again. The acoustic communications system 15 can handle small amounts of data and can communicate across larger distances.

Further, the pole comprises an optical or magnetic reader 16 which makes possible rapid reading of the results of the seismic collections. Read-off will, in the embodiment which is shown in FIG. 1, be able to take place after the poles are gathered in again.

The uppermost unit in the pole comprises a hydrophone 17 which is a transducer for pressure waves. Pressure and shear waves (P and S waves) which are reflected from the sediments, are detected by the three-dimensional geophones placed in the lower pointed end 2 of the geopole, while the hydrophone 17 only detects pressure waves in the water layer. When measurements from the hydrophone and from the 3 geophones 7-9 are correlated, and taking into consideration the distance between the hydrophone 17 and geophones 7-9, it is possible to separate upwardly travelling, reflected P-waves and S-waves from the P-waves which are reflected from the sea surface.

Without it in any way being considered to limit the invention, typical dimensions for a pole could be a length of approximately 1 m and a diameter of approximately 10 cm. The pole, when in use, shall be forced well down into the sea bed so that the pointed end 2 provides good contact with the sea bed. With the dimensions of the geopole which are mentioned above, it will, typically, be forced approximately 20-40 cm down into the sea bed. The depth is moreover strongly dependent on the nature of the sea bed. Soft bed requires deeper penetration and vice versa.

In the following, a preferred method for utilization of several geopoles in seismic exploration of off-shore substratum will be described with reference to FIG. 2A-2E.

In a preferred embodiment the poles, as shown in FIGS. 2A, 2D, poles 28 will, prior to the exploration, be inserted into the sea bed in a definite pattern. In FIG. 2A an example is shown of such a pattern where the poles 21 are placed in the corners in a quadratic square pattern. A regular and rectangular square pattern can also be possible and is dependent on the purpose of the survey.

In laying-out of two-dimensional geopole arrays on the sea bed, it is possible to achieve three-dimensional data collection which is important in order to make true three-dimensional depiction of the substratum possible.

In some situations it will be advantageous to have the geophones 21 placed in groups, so that the mutual distance between the poles 21 varies for each group. This will be particularly advantageous when it is desirable to specially survey local parts of the substratum.

Figure 2B:
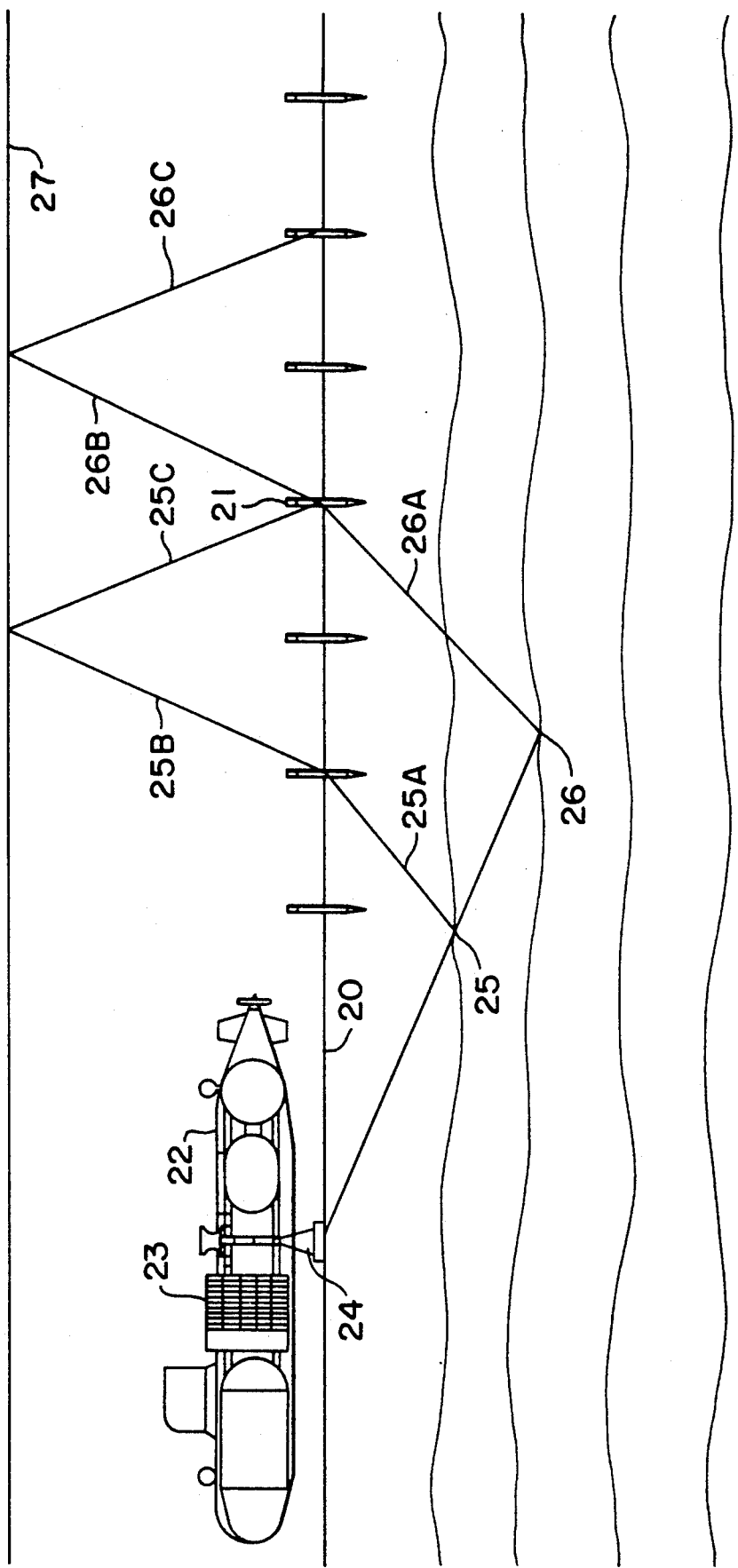
FIG. 2B illustrates execution of a seismic exploration.
Figure 2C:
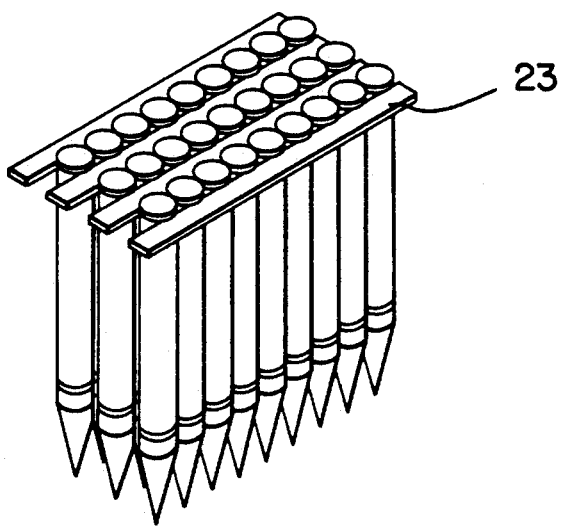
FIG. 2C illustrates a magazine for poles according to the invention.

The laying out of the geopoles is a time-demanding and somewhat difficult operation, not least because it is desirable that the poles are set out in a fairly accurate position. In FIG. 2A-2B it is indicated that the laying-out can be carried out be means of a submarine vessel 22 which is shown in FIGS. 2E and 2B. The poles can be stored in a magazine 23 in the submarine vessel 22. The magazine is shown in larger scale in FIG. 2c, and as the submarine vessel 22 moves along a line, poles are forced one by one into the sea bed.

After the poles 21 are placed out in the desired pattern, the seismic exploration can start by means of a seismic ship in the form of a submarine vessel 22 as shown in FIG. 2B, 2E or a surface vessel.

The seismic ship 22 will be provided with a source for generating wave and shear energy down in the formation in the vicinity of the poles 21. The energy source can come from many generators known per se. An air cannon which is the most usual source in marine surface seismology is suitable, even although it generates "secondary sources" (bubble effects) which will increase with increasing sea depth. Explosive sources are another well tried energy source which gives very good results. The explosives can be layed out on the sea bed or drilled a few meters down into the formation.

When using an underwater vessel 22, a marine bed vibrator 24 will be particularly advantageous. A modified version of existing vibrators can be used, in that it is pushed or is sucked towards the sea bed and functions as land seismic vibrators in operation.

The advantage of placing a vibrator on the sea bed is that it then becomes possible to make a greater part of the energy penetrate down into the sea bed and the achieve control and flexibility of the transmitted source signatures.

In the following a seismic exploration according to the invention will be described more closely.

A pressure, or combined pressure and shear wave is generated from a source and travels from the sea bed 20 and down into the substratum. In areas where there is a division in acoustic impedance between the layers in the formation, for example the points 25 and 26, a part of the energy will be reflected upwards as a combination of shear and pressure waves. They are indicated in FIG. 2B as wave 25A, 26A from the points 25 and 26 and the waves are recorded by the poles' geophones and hydrophones. The shear waves do not travel in water and they will transform into pressure waves at the sea bed 20 and travel further upwards illustrated in FIG. 2B as the waves 25B, 26B which will reach the water surface 27 where a part of them will be reflected back towards the sea bed as the waves 25C, 26C. The objective of the poles' hydrophones together with the geophones is exactly to be able to record downwardly travelling reflection waves from the surface together with the upwardly travelling reflection waves on the sea bed. Since geophones and hydrophones have a known orientation and distance of depth between each other, it is possible to separate upwardly and downwardly travelling waves.

Such a separation will be necessary because multiples or reflections from the sea surface will arrive at various points of time and will dominate the measurements more than in conventional collection.

After the seismic ship has generated the wave energy from one position, the ship changes position and generates new wave energy. The changing of position of the seismic ship each time wave energy is generated will take place in a predetermined pattern.

We claim:

1. A device including instruments for use on a sea bed for the collection and recording of first signals during offshore seismic exploration, said device comprising:
   first, second and third geophones arranged in x, y and z directions, respectively, which produce geophone signals;
   an electronic angle gauge;
   a compass;
   a top portion having means for allowing said device to be handled;
   an intermediate portion being substantially cylindrical in shape and having a first end connected to said top portion;
   a pointed end, connected to a second end of said intermediate portion, said pointed end housing said geophones, said electronic angle gauge, and said compass;
   a hydrophone for recording pressure waves being disposed proximate said top portion;
   a battery;
   a processor which processes said geophone signals;
   a memory unit which stores information;
   an acoustic communications system for receiving and transmitting second and third signals, respectfully;
   an optical reader which reads collected measurements; and
   a power supply which supplies power to said processor, and said memory unit;
   wherein said battery, said processor, said memory unit, said communication system, said optical reader, said power supply and said hydrophone are disposed in said intermediate portion.

2. A device including instruments for use on a seabed for the collection and recording of first signals during off-shore seismic exploration, said device comprising:
   first, second and third geophones arranged in x, y and z directions, respectively, which produce geophone signals;
   an electronic angle gauge;
   a compass;
   a top portion having means for allowing said device to be handled;
   an intermediate portion being substantially cylindrically in shape and having a first end being connected to said top portion;
   a pointed end, connected to a second end of said intermediate portion, said pointed end housing said geophones, said electronic angle gauge, and said compass;
   a hydrophone for recording pressure waves being disposed proximate said top portion;
   a battery;
   a processor which processes said geophone signals;
   a memory unit which stores information;
   an acoustic communications system for receiving and transmitting second and third signals, respectively;
   an optical reader which reads collected measurements; and
   a power supply which supplies power to said processor, and said memory unit;
   wherein said battery, said processor, said memory unit, said communication system, said optical reader, said power supply and said hydrophone are disposed in said intermediate portion;
   wherein said acoustic communications system receiving signal capability provides a first mechanism for starting and stopping the recording of said first signals, and the acoustic communications system transmitting signals capability simplifies a gathering in of the poles.

3. A device including instruments for use on a sea bed for the collection and recording of first signals during offshore seismic exploration, said device comprising:
   first, second and third geophones arranged in x, y and z directions, respectively, which produce geophone signals;
   an electronic angle gauge;
   a compass;
   a top portion having means for allowing said device to be handled;
   an intermediate portion being substantially cylindrical in shape and having a first end connected to said top portion;
   a pointed end, connected to a second end of said intermediate portion, said pointed end housing said geophones, said electronic angle gauge, and said compass;
   a hydrophone for recording pressure waves being disposed proximate aid top portion;
   a battery;
   a processor which processes said geophone signals;
   a memory unit which stores information;
   an acoustic communications system for receiving and transmitting second and third signals, respectfully;
   a reader which supplies power to said processor, and said memory unit;
   wherein said battery, said processor, said memory unit, said communication system, said reader, said power supply and said hydrophone are disposed in said intermediate portion.

4. A device as recited in claim 3, wherein said reader is a magnetic reader.

* * * * *